United States Patent Office 3,227,709
Patented Jan. 4, 1966

3,227,709
DERIVATIVES OF CEPHALOSPORIN C
AND PROCESS
Arthur A. Patchett, Metuchen, and Robert W. Parsons,
Jr., Summit, N.J., assignors to Merck & Co., Inc., Rahway, N.J., a corporation of New Jersey
No Drawing. Filed Nov. 28, 1961, Ser. No. 155,459
5 Claims. (Cl. 260—243)

This invention relates to organic compounds having antibiotic activity and, more particularly, it is concerned with amide derivatives of cephalosporin C and its derivatives and to processes for the preparation of these compounds.

The antibiotic substance of cephalosporin C and its preparation by fermentation of suitable species of cephalosporin have been described in the art. This antibiotic, which has been found to have the following structure, is active against both gram positive and gram negative bacteria:

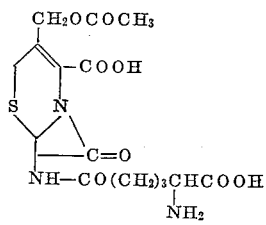

Accordingly it is an object of the present invention to provide novel derivatives of cephalosporin C having antibiotic activity.

Another object of this invention is to provide amide derivatives of cephalosporin C and its derivatives and processes for the preparation of such compounds.

A more specific object of the present invention is to provide novel amide derivatives of N-acyl cephalosporin C.

These and other objects will be made apparent in the following more detailed description of the invention which follows.

In accordance with the present invention, there is provided a method for the preparation of novel amide derivatives of cephalosporin C and their N-acylated derivatives. What is produced thereby are amides which may be illustrated structurally as follows:

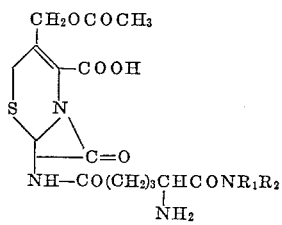

in which $-CONR_1R_2$ is an amido group in which $R_1$ and $R_2$ are selected among hydrogen, a hydrocarbon and a hydrocarbon substituted radical.

Suitably $R_1$ and $R_2$ are selected among the group consisting of hydrogen, alkyl, aralkoxy, cycloalkyl, aryl, aralkyl and heterocyclic and combinations and substituted derivatives thereof, including the above and halogen, nitro, hydroxy and the like. Preferably $R_1$ and $R_2$ contain between 1 and 20 carbon atoms.

In accordance with another feature of the present invention, there is provided a method for preparing compounds of the general formula presented above, which may be illustrated structurally as follows:

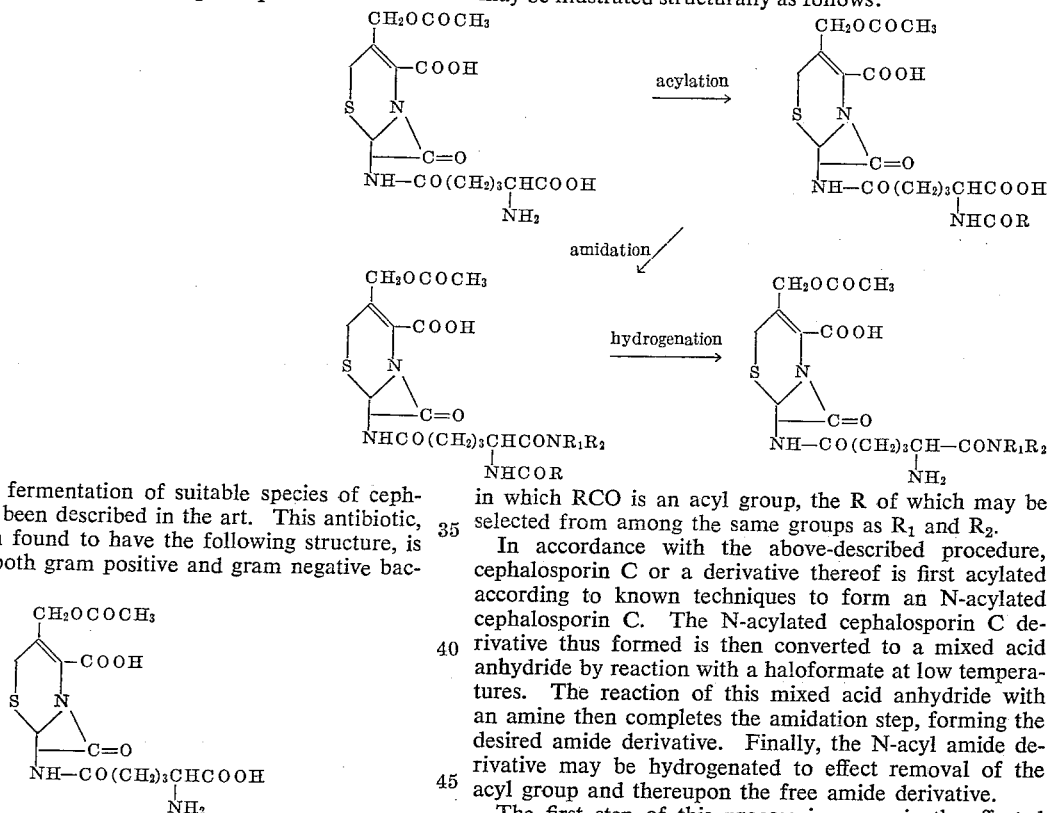

in which RCO is an acyl group, the R of which may be selected from among the same groups as $R_1$ and $R_2$.

In accordance with the above-described procedure, cephalosporin C or a derivative thereof is first acylated according to known techniques to form an N-acylated cephalosporin C. The N-acylated cephalosporin C derivative thus formed is then converted to a mixed acid anhydride by reaction with a haloformate at low temperatures. The reaction of this mixed acid anhydride with an amine then completes the amidation step, forming the desired amide derivative. Finally, the N-acyl amide derivative may be hydrogenated to effect removal of the acyl group and thereupon the free amide derivative.

The first step of this process is conveniently effected by intimately contacting a cephalosporin C with an acyl chloride in aqueous medium in the presence of a mild base at ice temperature. In carrying out this reaction, the acylating agent is preferably added to the aqueous solution of a water soluble salt of cephalosporin C; the reaction is conveniently effected in the presence of a suitable water-miscible organic solvent for the acylating agent, such as acetone and the like. Alternatively, a solution of the acylating agent in a suitable water-miscible solvent can be added to the aqueous solution of the cephalosporin. After the completion of the reaction, the N-acyl compound is recovered by acidifying the aqueous reaction mixture or by extracting the acidified mixture with the water-miscible solvent for the acid, such as methylisobutylketone. If desired, the acyl compound can be further purified by crystallization from a suitable solvent or solvent mixtures in accordance with procedures well known in the art.

The N-acyl derivative of cephalosporin C thus prepared is then converted to a mixed acid anhydride with a chloroformate ester in the presence of a strong base, at Dry Ice-acetone temperatures. This step is most conveniently effected by adding isobutylchloroformate dissolved in acetonitrile to a solution of the acyl derivative in acetonitrile solvent together with triethyl amino, for a time sufficient to allow the reaction to proceed. Then a solution of an amine is added to the reaction product to complete the amidation step, and the desired amide is isolated from the reaction mixture.

The final step in the process is the removal of the N-acyl group by hydrogenation in the presence of the catalyst. For this purpose, it is necessary that a carbobenzyloxy acylated product be utilized as an intermediate. The hydrogenation is normally carried out at room temperature and at atmospheric pressure, the pH of the reaction mixture being from 5 to 9. The solvent of the hydrogenation reaction is normally water, but other nonreducible solvents, such as ethyl alcohol or dioxane, or mixtures of these with water, may be employed. The preferred hydrogenation catalyst is palladium but other catalysts, such as platinum or rhodium, may be used. The catalyst is preferably employed on an inert support, e.g., of barium carbonate, carbon, strontium carbonate or diatomaceous earth.

Pursuant to a further embodiment of this invention, the amide and acylated amide derivatives of cephalosporin C can be further reacted with heterocyclic bases to produce the corresponding heterocyclic base derivatives of the amide of desacetoxy chephalosporin C. Thus, upon reacting the acylated amide of cephalosporin C with pyridine in aqueous solution, the pyridinium derivative of the amide of desacetoxy cephalosporin C is obtained. This product may be shown structurally as follows:

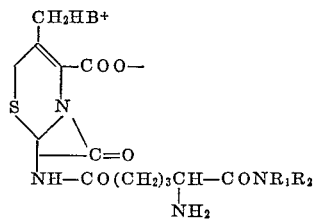

These heterocyclic base derivatives are valuable modifications of the amide compounds and possess enhanced bactericidal activity. These products are useful for the same purposes as the amide derivatives of cephalosporin C. Suitably HB+ is selected from among such heterocyclic bases as pyridine, alkylated derivatives thereof, such as collidine and lutidine, quinoline, acridine and the like.

The examples which follow will illustrate the more detailed features of the present invention.

EXAMPLE I

*Preparation of 7-(5'-benzoylamido-5'-carbobenzylaminopentanamido)-cephalosporanic acid.*

Ten grams of the sodium salt of cephalosporin C is N-benzoylated essentially according to the procedure of E. P. Abraham and G. F. Newton, Brit. Pat. 847,375; Sept. 7, 1960. The crude reaction mixture is then acidified and contacted with n-butanol. Removal of the washed and dried solvent gave after trituration with ether, 6.8 grams of crude N-benzoyl cephalosporin C as the free acid.

The solid (6.8 g.) is stirred thoroughly with 2.97 g. of triethylamine (dried over KOH pellets) in 114 ml. of acetonitrile (dried over sodium sulfate) and a small amount of insoluble material is filtered off. To the filtrate, protected from moisture and cooled in a Dry Ice-acetone bath maintained at −38 to −42° C., is added 2.26 g. of isobutyl chloroformate dissolved in 57 ml. of dry acetonitrile dropwise with stirring over a six minute period. The bath is allowed to warm slowly to −30° over a ten minute period, and then it is brought back to −38 to −42° for seven minutes. A solution of 1.76 g. of benzylamine in 57 ml. of dry acetonitrile is then added dropwise to the stirred moisture over a six minute period at the bath temperature of −38° to −42°. Stirring is continued over an hour period as the bath temperature rises slowly to +5°. The solution is filtered and concentrated on a rotator in vacuo, to a gummy residue which is taken up in 60 ml. of water, washed with 100 ml. of ether and acidified in the cold with 2 N HCl to complete precipitation of a gummy resin. This mixture is immediately extracted twice with a total of 200 ml. of n-butanol. The combined butanol is washed three times with 40 ml. of water, and then it is extracted four times with a total of 120 ml. of 5% NaHCO₃ and three times with 30 ml. each of water. These bicarbonate and latter aqueous extracts combined are acidified with dilute phosphoric acid and back-extracted with a total of 250 ml. of n-butanol. The water-washed and dried solvent is removed at the oil pump at 25° on a rotary evaporation. Trituration with ether gave 2.0 g. of pale tan solid which is converted to the lithium salt from 60 ml. of n-butanol by the addition of sufficient 5% lithium 2-ethylhexanoate in n-butanol to complete the formation of a colorless, gelatinous precipitate. Atfer filtration and thorough washing with n-butanol and then ether, 1.0 g. of white solid was obtained.

A fifteen-transfer countercurrent separation of 877 mg. of this crude product is carried out using n-butanol-ethanol-water system (volume ratio: 4:1:5) in a Craig machine having a lower phase capacity of each tube: 10 ml. Emulsions are broken by the addition of a few drops of ethanol. After concentration to dryness at 25° at the oil pump, the contents of each tube are triturated with acetone to complete solidification of the product. The total yield of crystalline colorless solid from the proper fraction [as determined by paper chromatography of each fraction in the system butanol-ethanol-water (4:1:5)] after thorough washing with acetone and then ether is 281 mg.; U.V. max. 227, 258 m$\mu$.; E% 274, 156 (methanol); M.P. 198–202° (decomp.) with prior darkening around 150°.

After recrystallization from methanol-acetone, the material is characterized by M.P. 203–207° (decomp.) and prior darkening around 150°; U.V. max. 227, 260 m$\mu$.; E% 268, 153 (methanol), and I.R. (KBr Pellet) absorption at 2.85–3.0$\mu$ (broad), 3.05; 5.70, 5.81, 6.0–6.17 (broad), 6.50, 6.70 and 7.90$\mu$.

*Analysis.*—Calc'd. for 7 - (5'-benzoylamino-5'-carbobenzylaminopentanamido)-cephalosporanic acid.

$$C_{20}H_{31}N_4O_8SLi \cdot CH_3OH$$

C, 57.58; H, 5.46; N, 8.67. Found: C, 57.43; H, 5.23; N, 8.39.

EXAMPLE II

*Preparation of 7-(5'-carbobenzylaminopentanamido)-cephalosporanic acid*

Following the procedure described in detail above and using carbobenzyloxy chloride in place of benzoyl chloride, there is produced the corresponding 7-(5'-carbobenzyloxyamido - 5'-carbobenzylaminopentanamido)-cephalosporanic acid.

A suspension of palladium on barium carbonate (3.7 grams of 30%) in water (20 ml.) is shaken in an atmosphere of hydrogen at room temperature. The catalyst is then filtered and washed well with water, care being taken that it does not become dry. A solution of sodium salt of 7-(5'-carbobenzyloxyamido-5'-carbobenzylaminopentanamido)-cephalosporanic acid (4 grams) in water (20 ml.) is added to the pretreated catalyst and the suspension is shaken in an atmosphere of hydrogen at room temperature and pressure for one hour. The catalyst is then filtered off, washed well with water. The resulting solution is evaporated in vacuo at a temperature below 20° C. to give 7-(5'-carbobenzylaminopentanamido)-cephalosporanic acid.

EXAMPLE III

Following the procedure described in detail in the above example and using the following amines: cyclohexylamine, aniline, 3-aminoquinoline, 3-amino pyridine, pyrrolidine, 3-dimethylaminopyrrolidine, N-methyl aniline, N-methyl p-chloroaniline, N-ethyl m-chloroaniline, p-chloroaniline, p-methoxyaniline N-methyl p-methoxyaniline, 1,aminopropene-2, p-nitrobenzylamine, p-chlorobenzyl methylamine, n-propylamine and diethylamine in place of benzylamine, there is produced the corresponding cephalosporin C amides.

EXAMPLE IV

*Preparation of pyridium - desacetoxy 7 - (5'-carbobenzyloxyamido-5'-carbobenzylaminopentanamido) - cephalosporanic acid.*

Ten grams of the crude acylated amide of cephalosporin C derivative prepared as described in Example II is dissolved in 500 cc. of water and 75 cc. of pyridine. This solution is left at 37° for three days under nitrogen. Half of the water is then removed on a rotating evaporator and the remaining solution is extracted with butanol to remove gummy impurities. The water layer is taken completely to dryness on the evaporator at room temperature to give 5.48 g. of crude product.

This material is dissolved in 270 cc. of water with the aid of 12 cc. of pyridine. The solution is stirred for one hour with 42 g. of IRA–400 ($HCO_3-$) washed with 100 cc. of methylisobutyl ketone and lyopholized to give 1.17 g. of pale yellow, slightly hygroscopic solid. This is dissolved in 20 cc. of the lower phase of a n-butanol-glacial acetic acid-water system (volume ratio 4:1:5) and put in the first two tubes of a forty-tube Craig machine. After completion of the counter-current separation process, the contents of the tubes are lyopholized. Paper chromatography in the n-butanol-acetic acid water system mentioned above allows combination of pure fractions of the said pyridium product.

EXAMPLE V

Following the procedure described in detail in the example above, and using pyridine, alkylated derivatives thereof, such as collidine and lutidine, quinoline, acridine and the like, in place of pyridine as the heterocyclic base, there is produced the corresponding heterocyclic base desacetoxy compounds.

What is claimed is:

1. 7 - (5'-benzoylamido - 5' - carbobenzylaminopentanamido) - cephalosporanic acid.

2. A member having the formula:

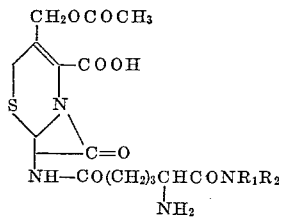

$NH—CO(CH_2)_3CHCONR_1R_2$
  $\quad\quad\quad\quad\quad\quad\quad |$
  $\quad\quad\quad\quad\quad\quad\quad NH_2$ wherein —$NR_1R_2$ is selected from the group consisting of amino, benzylamino, cyclohexylamino, anilino, 3-aminoquinolino, 3 - aminopyridino, pyrrolidino, 3 - dimethylaminopyrrolidino, N-methylanilino, N-methyl-p-chloroanilino, N-ethyl-m-chloroanilino, p-chloroanilino, p-methoxyanilino, N-methyl-p-methoxyanilino, 1-aminopropene-2, p-nitrobenzylanino, p-chlorobenzylamino, n-propylamino and diethylamino.

3. A member having the formula:

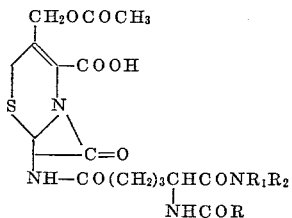

$NH—CO(CH_2)_3CHCONR_1R_2$
  $\quad\quad\quad\quad\quad\quad\quad |$
  $\quad\quad\quad\quad\quad\quad\quad NHCOR$ wherein —$NR_1R_2$ is selected from the group consisting of amino, benzylamino, cyclohexylamino, anilino, 3-aminoquinolino, 3-aminopyridino, pyrrolidino, 3-dimethylaminopyrrolidino, N-methylanilino, N-methyl-p-chloroanilino, N-ethyl-m-chloroanilino, p-chloroanilino, p-methoxyanilino, N-methyl-p-methoxyanilino, 1-aminopropene-2, p-nitrobenzylanino, p-chlorobenzylamino, n-propylamino, and diethylamino, and R is selected from the group consisting of benzoyl and carbobenzyloxy.

4. A member having the formula:

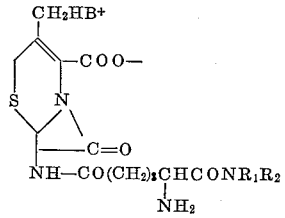

$NH—CO(CH_2)_3CHCONR_1R_2$
  $\quad\quad\quad\quad\quad\quad\quad |$
  $\quad\quad\quad\quad\quad\quad\quad NH_2$ wherein —$NR_1R_2$ is selected from the group consisting of amino, benzylamino, cyclohexylamino, anilino, 3-aminoquinolino, 3 - aminopyridino, pyrrolidino, 3 - dimethylaminopyrrolidino, N-methylanilino, N-methyl-p-chloroanilino, N-ethyl-m-chloroanilino, p-chloroanilino, p-methoxyanilino, N-methyl-p-methoxyanilino, 1-aminopropene-2, p-nitrobenzylanino, p-chlorobenzylamino, n-propylamino, and diethylamino, and HB+ is a heterocyclic base selected from the group consisting of pyridine, collidine, lutidine, quinoline and acridine.

5. A method of making a member having the formula:

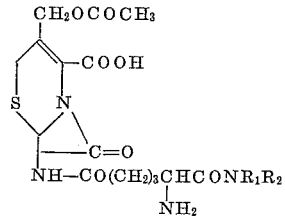

$NH—CO(CH_2)_3CHCONR_1R_2$
  $\quad\quad\quad\quad\quad\quad\quad |$
  $\quad\quad\quad\quad\quad\quad\quad NH_2$ wherein —$NR_1R_2$ is selected from the group consisting of amino, benzylamino, cyclohexylamino, anilino, 3-aminoquinolino, 3-aminopyridino, pyrrolidino, 3-dimethylaminopyrrolidino, N-methylanilino, N-methyl-p-chloroanilino, N-ethyl-m-chloroanilino, p-chloroanilino, p-methoxyanilino, N-methyl-p-methoxyanilino, 1-aminopropene-2, p-nitrobenzylamino, p-chlorobenzylamino, n-propylamino, and diethylamino, which comprises the steps of:

(a) intimately contacting the alkali metal salt of a compound having the formula:

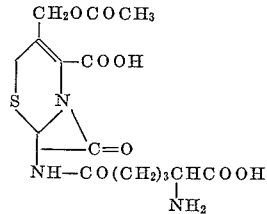

$NH—CO(CH_2)_3CHCOOH$
  $\quad\quad\quad\quad\quad\quad\quad |$
  $\quad\quad\quad\quad\quad\quad\quad NH_2$ with a member selected from the group consisting of a carbobenzyloxy halide and a benzoyl halide, to form the corresponding N-acetylated acid compound of the formula:

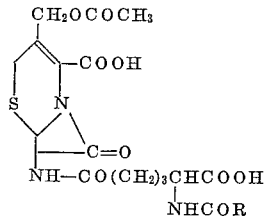

$NH—CO(CH_2)_3CHCOOH$
  $\quad\quad\quad\quad\quad\quad\quad |$
  $\quad\quad\quad\quad\quad\quad\quad NHCOR$ wherein R is selected from the group consisting of benzoyl and carbobenzyloxy;

(b) and contacting said N-acylated acid compound with a haloformate ester to form a mixed acid anhydride of formic acid and said N-acylated acid, and contacting said mixed acid anhydride with an amine having the formula $NR_1R_2H$, wherein $—NR_1R_2$ is as defined above, to form the N-acyl amide of the formula:

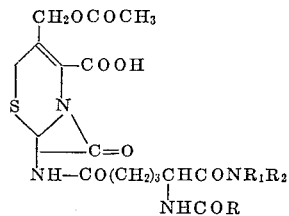

wherein $—NR_1R_2$ and R are as defined above, and (c) contacting said N-acyl amide compound with hydrogen in the presence of a hydrogenation catalyst.

References Cited by the Examiner

Burger: Medicinal Chemistry, page 46 (1960).
Jour. Amer. Medical Assoc., page 466, May 24, 1958.
Morton: The Chemistry of Heterocyclic Compounds, page VI of the preface (1946).
Wertheim: Text Book of Organic Chemistry, pages 763–764 (1945).

NICHOLAS S. RIZZO, *Primary Examiner.*

JAMES W. ADAMS, *Assistant Examiner.*